(12) United States Patent  (10) Patent No.: US 8,505,444 B2
McGuigan                       (45) Date of Patent:     Aug. 13, 2013

(54) MARSHMALLOW ROASTER

(76) Inventor: Michael B McGuigan, Fort Myers Beach, FL (US)

(*) Notice: Subject to any disclaimer, the term of this patent is extended or adjusted under 35 U.S.C. 154(b) by 841 days.

(21) Appl. No.: 12/136,824

(22) Filed: Jun. 11, 2008

(65) Prior Publication Data

US 2009/0308262 A1  Dec. 17, 2009

(51) Int. Cl.
*A47J 43/18* (2006.01)
*A47J 37/06* (2006.01)

(52) U.S. Cl.
USPC .......... 99/421 R; 99/419; 99/421 H; 426/233; 426/523

(58) Field of Classification Search
USPC ............... 99/421 R, 419, 420, 421 H, 421 M, 99/426, 428; D7/357
See application file for complete search history.

(56) References Cited

U.S. PATENT DOCUMENTS

| | | | | |
|---|---|---|---|---|
| 2,239,862 A * | 4/1941 | Scalph | ............................. | 99/391 |
| 2,245,220 A * | 6/1941 | Nelson | ........................ | 99/421 H |
| 2,663,449 A * | 12/1953 | Smart | ............................ | 220/543 |
| 2,749,424 A * | 6/1956 | Dieterich | ....................... | 219/552 |
| 2,766,681 A * | 10/1956 | Rigo | .............................. | 99/419 |
| 2,940,380 A * | 6/1960 | Rampel | ............................ | 99/346 |
| 3,744,403 A * | 7/1973 | Castronuovo | ............... | 99/421 V |
| 5,174,195 A * | 12/1992 | Anderson | ........................ | 99/419 |
| 5,639,497 A * | 6/1997 | Bedford et al. | ............... | 426/233 |
| 6,213,004 B1 * | 4/2001 | Franco | .......................... | 99/421 H |
| 2007/0277681 A1* | 12/2007 | Wang | .............................. | 99/482 |
| 2008/0156198 A1* | 7/2008 | Leason et al. | ................... | 99/326 |
| 2009/0241784 A1* | 10/2009 | Colby | .......................... | 99/421 A |

* cited by examiner

*Primary Examiner* — Gene Kim
*Assistant Examiner* — Matthew B Stanczak

(57) ABSTRACT

A marshmallow roasting unit is provided that comprises an enclosure having a roasting chamber and a side defining an enclosure opening below the roasting chamber, a skewer disposed in the roasting chamber and configured to hold a marshmallow, a heating element disposed relative to the skewer in the roasting chamber, and a removable tray configured to be inserted into the enclosure opening and hold a cracker in the enclosure under the roasting chamber. The heating element is disposed a predetermined range from the skewer such that the heating element is effective to roast the marshmallow on the skewer until the marshmallow becomes pliable and falls on to the cracker or contents disposed on the cracker held on the removable tray.

31 Claims, 11 Drawing Sheets

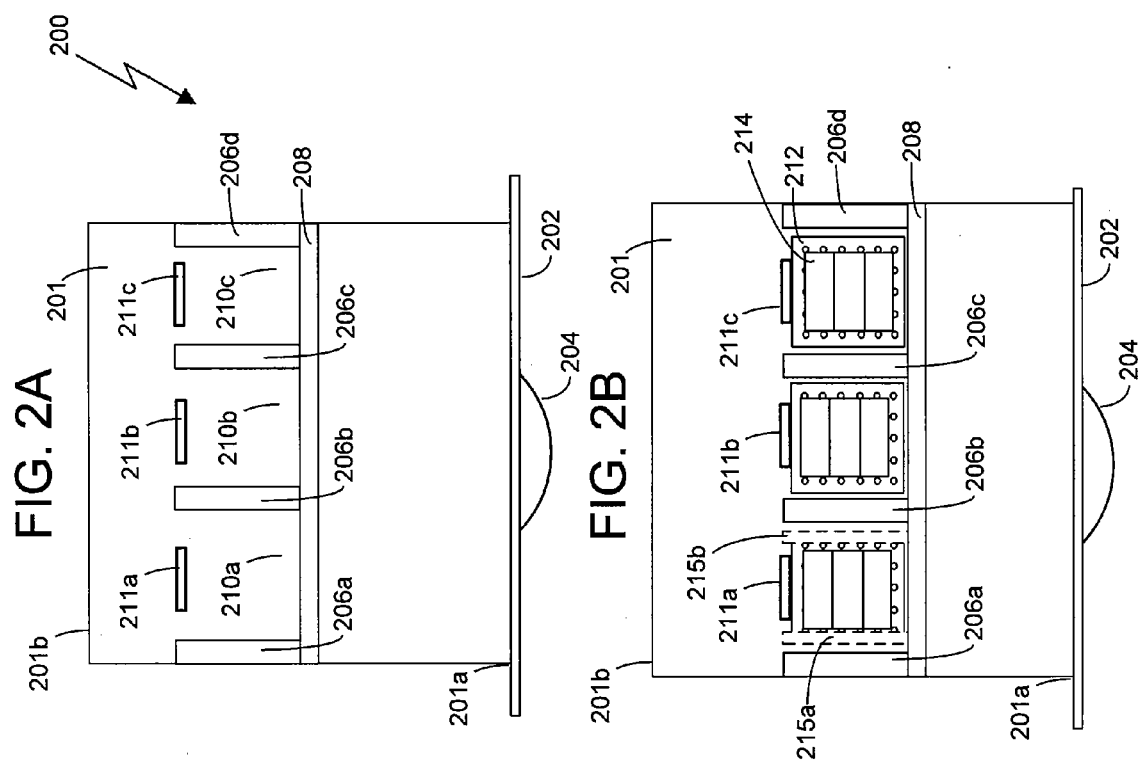

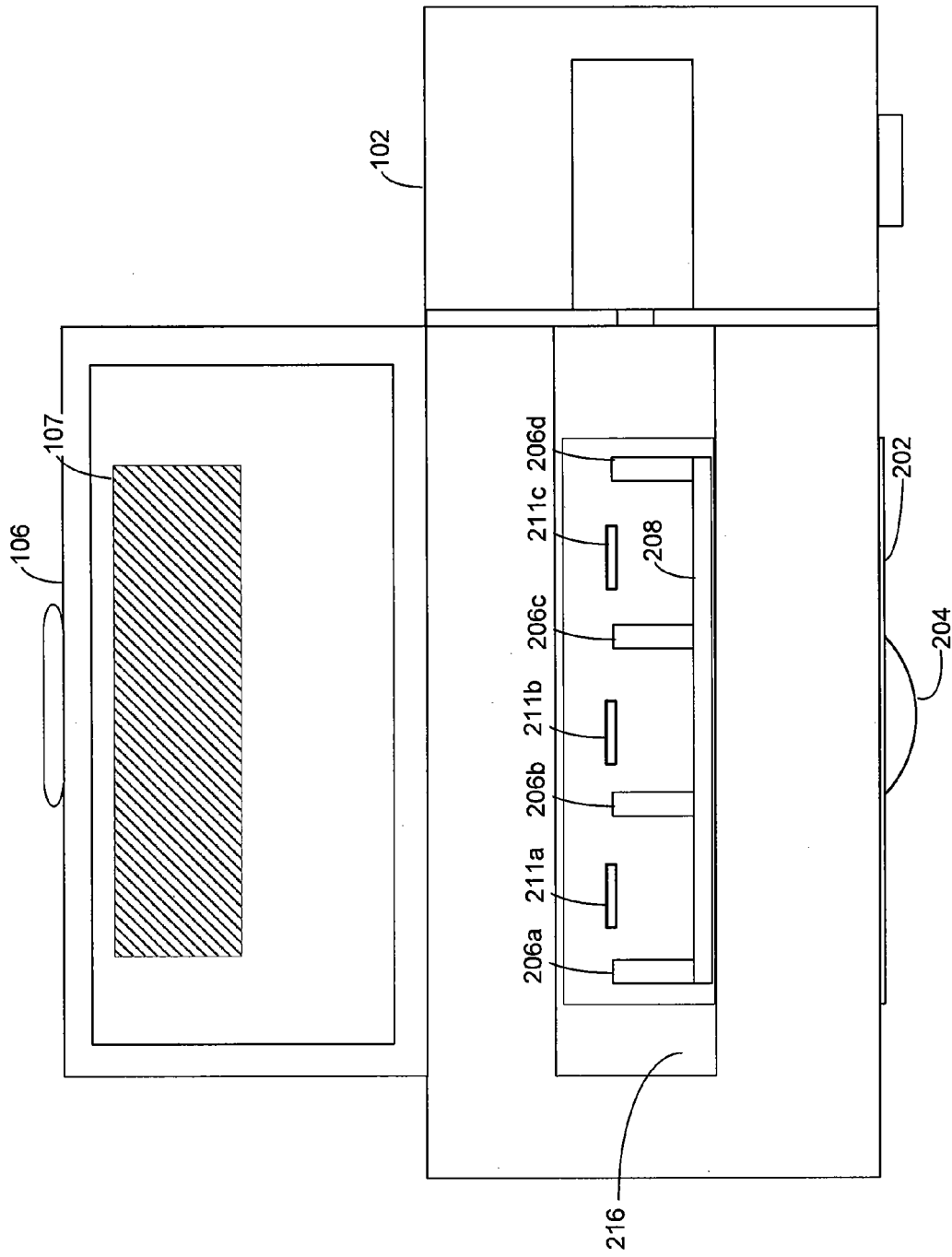

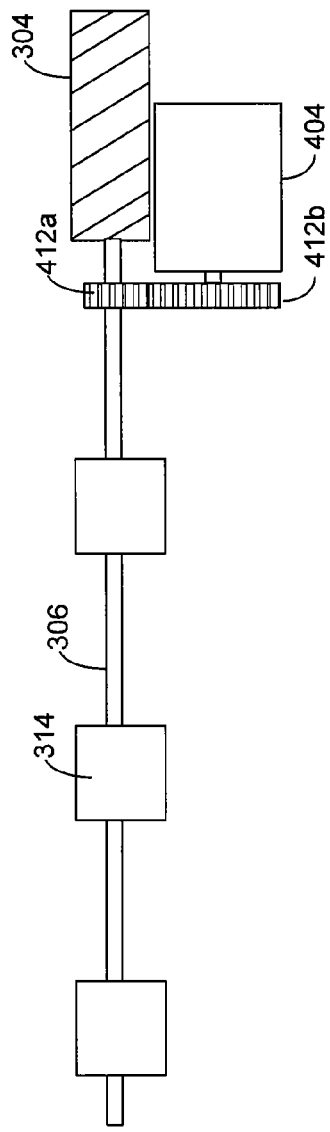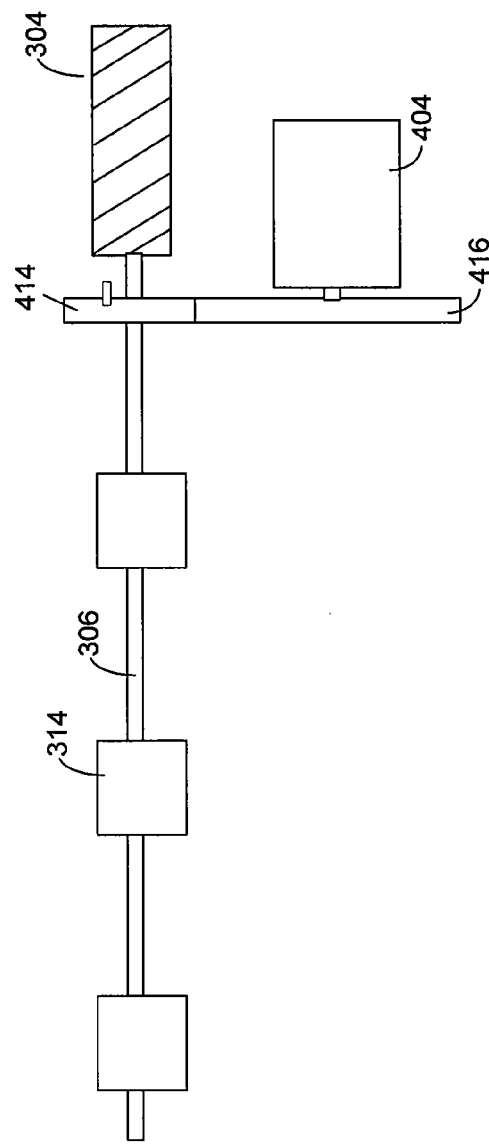

MARSHMALLOW ROASTER

FIELD OF THE INVENTION

This invention relates to roasting devices used to roast marshmallows and drop the marshmallows on to crackers when the marshmallows are fully roasted.

BACKGROUND OF THE INVENTION

Roasting a marshmallow over an open fire and combining the roasted marshmallow with gram crackers and chocolate has long been a popular food item referred to as a S'more. The typical preparation of a S'more involves roasting marshmallows on a skewer over an open fire until the marshmallows are roasted, then removing the roasted marshmallows from the skewer and placing them between two gram crackers along with a flat chocolate bar.

While convention ovens with rotisseries exist in the current market these ovens are designed for cooking chickens and other meats and are not adapted to roasting marshmallows. Some of the problems encountered while using a conventional oven to roast marshmallows include the marshmallows expanding too quickly, charring of the exterior surface before the marshmallow is thoroughly roasted, igniting the marshmallows and not browning the marshmallow at all before the marshmallow falls from the rotisserie. These problems occur because of the operating speed of the rotisserie, and the number and strength of the heating elements, and the distance from the heating elements to the rotisserie skewer.

Skewers used in certain conventional ovens or rotisseries typically mount inside the oven unit. As a result, the skewers are heated with the marshmallows. Because the skewer is heated, the skewer cannot be easily removed without the risk of being burned unless an oven mitt or other insulated hand protection covering is employed. Accordingly, an effective manner of roasting a marshmallow which thoroughly roasts and browns the marshmallow in a safe manner is desirable.

In addition, gram crackers, that are set below the rotisserie skewer of a conventional oven (e.g. on a lower grill) are typically heated and baked to the extent that the crackers are no longer suitable for creating a S'more.

Furthermore, conventional ovens or rotisseries typically have grills and other components located below the skewer that inhibit roasted marshmallows from falling on a gram cracker. In addition, drip pans that are employed in conventional ovens or rotisseries are not suitable for creating S'mores as crackers cannot accurately be positioned below a marshmallow roasting on a conventional rotisserie skewer, leading to roasted marshmallows falling at least partially on the pan. Moreover, the drip pan opening in a conventional oven or rotisserie is not sized for the removal of a roasted marshmallow.

In view of these problems, it is highly desirable to have a single apparatus for roasting marshmallows and placing the roasted marshmallow on to a gram cracker without having to touch the roasted marshmallow and which does not use an open flame.

SUMMARY OF THE INVENTION

Methods and articles of manufacture consistent with the present invention provide a marshmallow roasting unit that is suitable for roasting a marshmallow to create a S'more. The marshmallow roasting unit is configured to roast the marshmallow until the circumferential surface of the marshmallow is browned and the roasted marshmallow falls on to a cracker held on a removable tray of the roasting unit in accordance with the present invention.

In one embodiment, a marshmallow roasting unit is provided that includes an enclosure having a roasting chamber and a side defining an enclosure opening below the roasting chamber, a skewer disposed in the roasting chamber and configured to hold a marshmallow, and a removable tray configured to be inserted into the enclosure opening and hold a cracker in the enclosure under the roasting chamber. The removable tray includes a plurality of alignment elements configured to position the cracker below the marshmallow on the skewer when the removable tray is inserted into the enclosure opening. The skewer may be removable from the roasting chamber. In one implementation, the alignment elements are adjustable. In addition, the alignment elements may have a height sufficient to align a chocolate piece and the cracker together. The enclosure opening may be sized to enable the removable tray to be removed from the enclosure opening with the cracker disposed on the tray and the marshmallow after roasting disposed at least partially on the cracker without the enclosure side interfering with the marshmallow.

In yet another embodiment, a marshmallow roasting unit is provided that includes an enclosure having a roasting chamber and a side defining an enclosure opening below the roasting chamber, a skewer disposed in the roasting chamber and configured to hold a marshmallow, a heating element disposed relative to the skewer in the roasting chamber, and a removable tray configured to be inserted into the enclosure opening and hold a cracker in the enclosure under the roasting chamber. The heating element is effective to roast the marshmallow on the skewer so that the marshmallow becomes pliable and falls on to the cracker or contents disposed on the cracker held on the removable tray. In one implementation, the heating element is disposed within a range of 1 inch to 3 inches from a central axis of the skewer. The marshmallow roasting unit, may further comprise a rotation unit rotatively coupled to the skewer. In this implementation, the rotation unit has a predetermined angular speed effective in combination with the heating element to evenly brown a circumferential surface of the marshmallow before the marshmallow falls from the skewer.

Further, in yet another embodiment, the marshmallow roasting unit includes a controller and a temperature sensor located in the roasting chamber and electrically coupled to the controller. The controller is configured to control each heating unit to maintain a predetermined temperature in the roasting chamber. In yet another embodiment, the marshmallow roasting unit includes a rotation speed sensor disposed relative to the skewer. The controller is configured to control the speed of the rotation unit to maintain a predetermined rotational speed.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIGS. 2A and 2B depict exemplary top level views of the removable tray consistent with the present invention, in which the removable tray has alignment elements for positioning one or more graham crackers on the tray.

FIG. 2C depicts an exemplary top level view of the marshmallow roasting unit with the removable tray inserted in the unit in accordance with the present invention.

FIGS. 4B and 4C depict embodiments of a skewer driving mechanism consistent with the present invention.

DETAILED DESCRIPTION OF THE INVENTION

Figure 1A:
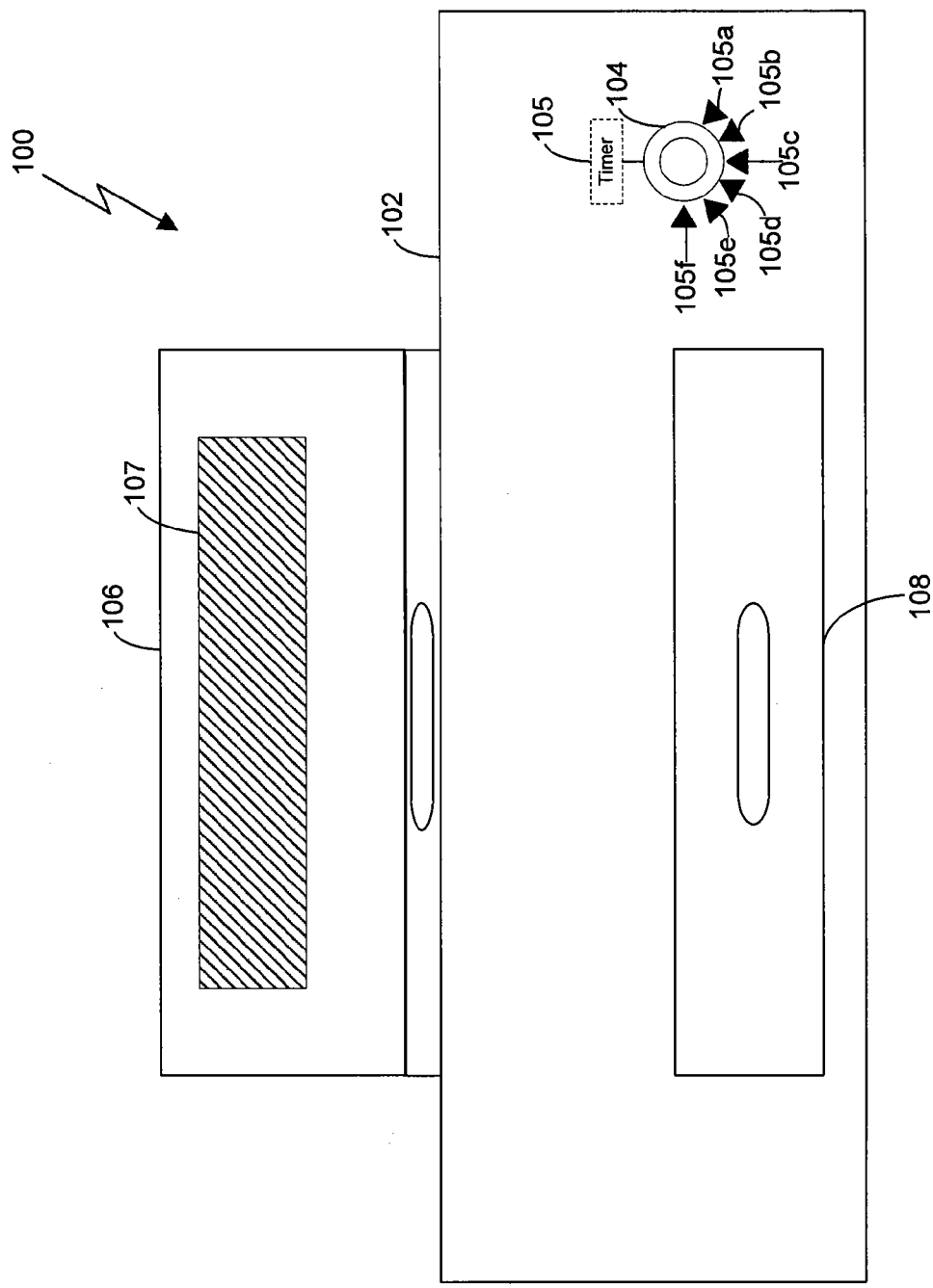
FIG. 1A depicts an exemplary front view of one embodiment of a marshmallow roasting unit consistent with the present invention.

Referring now to the drawings which depict different embodiments consistent with the present invention. Wherever possible, the same reference numbers will be used throughout the drawings and the following description to refer to the same or like parts.

Figure 1B:
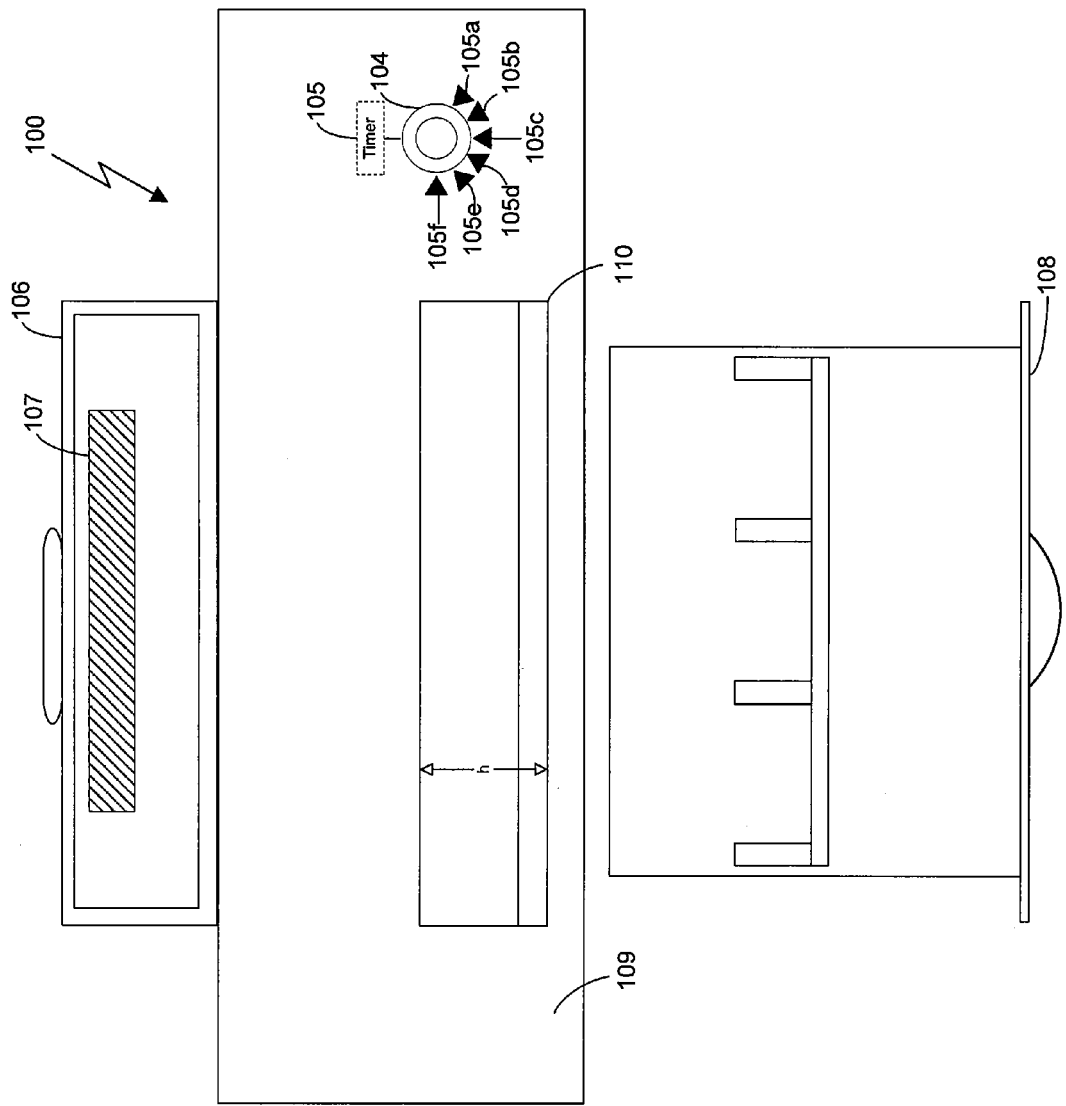
FIG. 1B depicts the marshmallow roasting unit in FIG. 1A with a removable tray consistent with the present invention, where the tray is shown removed from the marshmallow roasting unit.

FIGS. 1A and 1B depict an exemplary front view of a marshmallow roasting unit 100 consistent with the present invention. The marshmallow roasting unit 100 includes an enclosure 102, a timer 104, a lid 106 and a removable tray 108. FIG. 1B depicts the marshmallow roasting unit 100 with the lid 106 in the open position and the removable tray 108 detached from the enclosure 102. The lid 106 may be hingedly connected to the enclosure 102 and may be capable of opening and closing during and after a marshmallow roasting operation as further discussed herein. The lid 106 may also have an optional viewing window 109, which will allow a user to see the marshmallows roasting. The enclosure 102, lid 106, and removable tray 108 may be formed of aluminum or other material that is conducive for retaining heat in the enclosure 102, able to withstand temperatures between 300° F. to 800° F. or greater without melting, and otherwise conforming to Underwriter Laboratories (UL) guidelines for oven appliances. The enclosure 102 may be double walled with an air space or like insulation there between to inhibiting heat transfer to an outside surface of the enclosure 102 or the roasting unit 100. Although the enclosure 102 is shown to have a rectangular shape, the enclosure 102 may have a cylindrical, bowl, or other shape.

As shown in FIGS. 1A and 1B, the enclosure 102 has a side 109 defining an enclosure opening 110 below an internal roasting chamber 216 (e.g., as depicted in FIG. 2C) of the enclosure 102, a removable tray and hold a cracker in the enclosure under the roasting chamber The removable tray 108 is configured to be slidingly inserted into the enclosure 102 via the enclosure opening 110.

The timer 104 may be a programmable electronic timer as further discussed herein or an electromechanical timer such as disclosed in U.S. Pat. No. 4,678,930 or other commercially available appliance timer that enables a user to select from among a plurality of durations that the marshmallow roasting unit 100 will operate. For example, in the implementation shown in FIGS. 1A and 1B, the timer 104 is an electromechanical timer that includes a dial or knob 105 for a user to rotate to a selected one of a plurality of minute marks 105a-105f. In this implementation, the timer 104 is electrically coupled to a respective power input of a heating element (e.g., 402 in FIG. 4A) and/or an electric motor that functions as a rotational unit 404 of the marshmallow roasting unit 100 as further discussed herein so that the timer 104 is effective to operate or power on the heating element 402 and/or the rotational unit 404 for a duration corresponding to the selected one (e.g., 105a) of the plurality of minute marks 105a-105f.

In another embodiment, a contact switch (not shown in the figures) may be positioned between the lid 106 and the enclosure 102, and configured to interrupt power to the marshmallow roasting unit 100 or effectively turn off to heating element 402 and/or the rotational unit 404 when the lid 106 is opened. In another embodiment, a locking unit may lock the lid 106 when the marshmallow roasting unit 100 is in operation. The locking unit may include, but not be limited to, a magnet, a latch, a pin or any other suitable locking mechanism. However, in one implementation, the lid 106 may be omitted from the marshmallow roasting unit 100 or the lid 106 may be left in an open position as shown in FIG. 1B while the marshmallow roasting unit 100 is operated as discussed herein to roast one or more marshmallows to create one or more S'mores with crackers held on the removable tray 108.

FIGS. 2A, 2B and 2C depict embodiments of the removable tray 108 consistent with the present invention. The removable tray 108 comprises a bottom 201 having a front end 201a and a rear end 201b, a front face 202 attached to the front end 201a of the tray bottom 201 and sized to cover the enclosure opening 110, a handle 204 attached to the front face 202, and a plurality of alignment elements 206a-206d configured to position one or more crackers 212 held on the bottom 201 of the tray below a respective marshmallow 314 on a skewer 300 when the removable tray 108 is inserted into the enclosure opening 110. Each adjacent pair of the alignment elements 206a-206d defines a respective cracker placement area 210a, 210b, and 210c In the implementation shown in FIGS. 2A-2C, the alignment elements 206a-206d are spaced apart laterally on the tray 108 in a direction corresponding to the axis of rotation of a skewer 300 disposed in the roasting unit 100 as described in further detail herein.

The removable tray 108 may also include one or more backstop elements 208 disposed relative to the alignment elements 206a-206d to inhibit a cracker 212 positioned in a respective cracker placement area 210a-210c from moving towards the front face 203 of the tray 108 (for example, when the tray 108 is inserted in the enclosure opening 110. In the implementation shown in FIGS. 2A-2B, one backstop element 208 spans the width of the tray 108 and abuts each of the alignment elements 206a-206c. However, in an alternative implementation, the tray 108 may have a respective backstop element 208 for each cracker placement area 210a-210c. In this implementation, the backstop elements 208 may be staggered between the front face 202 and the alignment elements 206a-206d so that each cracker placement area 210a-210c may accept different sized crackers 212.

The bottom 201 of the removable tray 108 may also have a plurality of ribs or protrusions 211a-211c each of which is positioned between the alignment elements 206 (e.g., between an adjacent pair of alignment elements) and the rear end 201b of the tray bottom 201.

Each rib 211a-211c rises less than the thickness (t) of a cracker 212 above the tray bottom 201, inhibiting a cracker 212 positioned in a respective cracker placement area 210a-210c from moving towards the rear end 201b unless the tray 108 (or at least the tray bottom 201) is tilted from front end 201a towards 201b at a predetermined angle, where gravity enables the respective cracker 212 to slide over the rib 211a, 211b, or 211c. As discussed herein, by using ribs 211a-211c instead of backstop elements between the alignment elements 206 and the tray's rear end 201b, a user may tilt the tray 108 to enable the crackers 212 (or S'mores created with the crackers 212) to slide from the cracker placement areas 210a-210c on to a plate or other serving dish without the user having to touch the crackers 212 or S'mores.

In one implementation, the height of the alignment elements 206 (e.g., as measured out of the page in FIGS. 2A and 2B) may be such that a cracker 212 and a chocolate piece 214 may be aligned together in the cracker placement area 208. The alignment elements 206 may be secured to the removable tray 108 using screws or other fasteners so that the alignment elements 206 (alone or in combination with the backstop elements 208 and ribs 211a-221c) are effective to prevent the crackers 212 and chocolate piece 214 from moving while the tray 108 is in the enclosure 102. The front face 202 may be fabricated from a material with a low thermal conductive coefficient to prevent heating of the front face 206 during the roasting operation.

In another embodiment a second set of alignment elements 215, which may be moveable extensions of the stop element 208, may be positioned to assist in aligning a chocolate piece 214 relative to a respective cracker 212 disposed in a cracker placement area 208. In another embodiment, the alignment elements 206 may be detachable (via screws or other removable fasteners) from the tray 108. In yet another embodiment, the alignment elements 206 and 215 may be adjustable to accommodate a plurality of different cracker 212 and chocolate piece 214 sizes. For example, the backstop element 208 may have a channel (not in view in FIGS. 2A and 2B) facing the rear end 201b to which each of the alignment elements 206 and 215 may be slidingly engaged. In this implementation, each alignment element 206 and 215 may have a fastener or clamp that may be adjusted to temporarily affix the alignment element 206 or 215 to the backstop element 208 or to the tray bottom 201 at a desired or selected position.

FIG. 2C depicts one embodiment of the removable tray 108 inserted through the enclosure opening 110 and installed in the enclosure 102 of the marshmallow roasting unit 100 in accordance with the present invention. The enclosure 102 includes a roasting chamber 216 for roasting a marshmallow to create a S'more in accordance with the present invention. The removable tray 108 when inserted in the enclosure opening 110 is disposed under the roasting chamber 216 so that a marshmallow roasted in the roasting chamber 216 falls on a cracker 212 held on the removable tray 108. The lid 106, if employed, covers an access opening 217 of the roasting chamber 216 to contain heat generated during the roasting operation. The lid 106 may be made of a material with a lower thermal conductivity coefficient than the enclosure 102 to prevent the lid 106 from heating during the roasting operation.

In another embodiment, a contact switch (not shown in figures) may be positioned on the front face 202 of the removable tray 108 on the side of the front face 202 opposite the side 109 of the enclosure 102 that defines the enclosure opening 110. The contact switch may be configured to turn off the marshmallow roasting unit 100 (e.g., the heating element 402 or rotational unit 404) when the removable tray 108 is removed from the enclosure opening 110. In another embodiment, a locking unit may lock the removable tray 108 when the marshmallow roasting unit 100 is in operation. The locking unit may include, but not be limited to, a magnet, a latch, a pin or any other suitable locking mechanism. By providing a locking unit mechanism to turn off the marshmallow roasting unit 100 when the removable tray 108 is removed from the enclosure 012, the roasting unit inhibits user exposure to or contact with the heating elements 402.

Figure 3A:
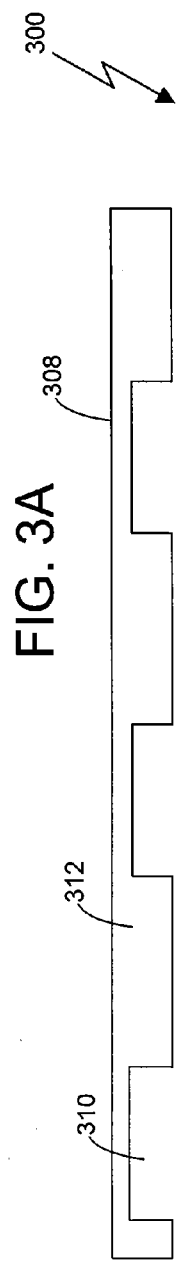
FIGS. 3A-3C depict embodiments of a marshmallow spacing unit and a skewer for roasting marshmallows in the marshmallow roasting unit in accordance with the present invention.
Figure 3B:
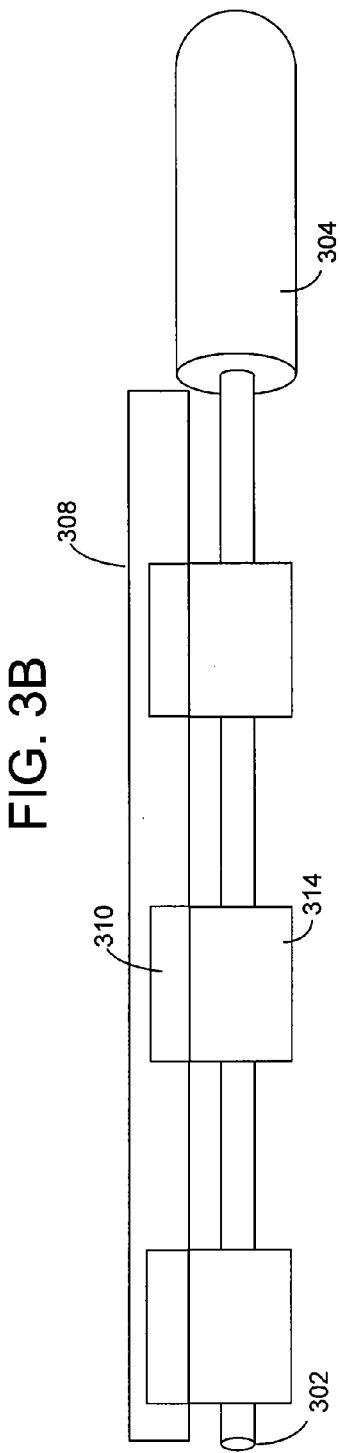

FIGS. 3A and 3B depict one embodiment of a marshmallow spacing unit 308 and a skewer 300 for roasting marshmallows in the marshmallow roasting unit 100 consistent with the present invention. The skewer 300 includes a handle 304 and a shaft 306 attached to the handle 304. The shaft 306 has an opposite end 302 for receiving one or more marshmallows 314 thereon. The marshmallow spacing unit 308 includes at least one marshmallow spacing notch 310 formed in a plate 312. The marshmallow spacing notch 310 may be set to a fixed distance indicative of a width of a marshmallow 314. As shown in FIG. 3B, the marshmallow spacing unit 308 is adapted to be aligned with the skewer 300. In one implementation, the skewer shaft 306 is the same length as the marshmallow spacing unit 308 such that the skewer 300 may be aligned to with the marshmallow roasting unit 308 when one end of the spacing unit 308 is set adjacent the end 302 of the skewer 300 opposite to the skewer handle 304. Each of the notches 310 in the spacing unit 308 is an indicator reflecting where to position a respective marshmallow 314 on the skewer 300 when the spacing unit 308 is aligned with the skewer 300 so that each marshmallow 314 is disposed directly above a respective cracker 212 held on the removable tray 108 when the tray 108 is inserted in the enclosure opening 110 and installed in the enclosure 102. In one implementation, the marshmallow spacing unit 308 is affixed to an external surface (e.g., on side 109) of the enclosure 102 so that the skewer 300 may easily be aligned with the marshmallow spacing unit 308. The plate 312 may be made from a material including, but not limited to, metal, plastic, paper, cardboard, or any other material that may hold its shape when aligned with the skewer 300.

In another embodiment, the marshmallow spacing notch 310 may be adjustable. As an illustrative example, two plates with marshmallow spacing notches 310 offset by a predetermined distance may be arranged on top of one another and connected to allow each plate to slide independent of the other plate. By moving one plate against the other plate, the marshmallow spacing notch 310 may be expanded or reduced.

Figure 3C:
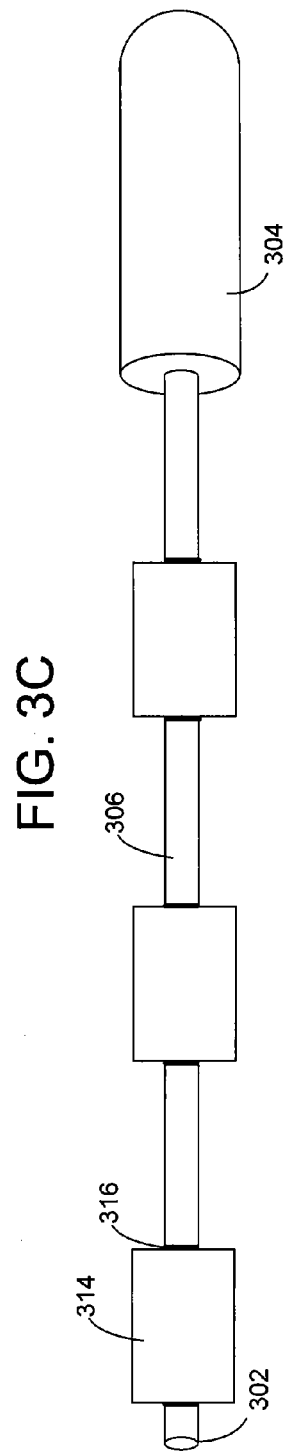

In another embodiment, depicted in FIG. 3C, the skewer 300 includes an identifier (i.e., marking 316) reflecting where to position the marshmallow 314 on the skewer 300. The identifier or marking 316 may be formed on the skewer shaft 306 or may be adjustable rings which slide along the shaft. In an alternative implementation, the identifier or marking 316 may correspond to a first portion of the skewer having a color (e.g., yellow) different than another color (e.g., black) of the remaining portion of the skewer 300.

The shaft 306 of the skewer 300 may comprise a material with a higher coefficient of thermal conductivity than the handle 304 to prevent the handle from becoming hot during the roasting operation. The skewer shaft 306 may also have a length of about six and a half inches to accommodate at least three standard sized marshmallows and may taper from the handle to the opposite end. In one implementation, the skewer 300 has multiple skewer shafts 306 each being capable of holding multiple marshmallows 314 at once with each shaft being spaced approximately ¾ inch from adjacent skewers 306. In this embodiment, the diameter of each skewer shaft 306 is approximately one eighth of an inch. In another embodiment, the skewer 300 includes a or rubber wheel or gear (e.g., 412a in FIG. 4B) located on either or both ends of the skewer shaft 306 for coupling to a rotation unit 404 and facilitate rotation of the skewer 300 with little or no jitter of the skewer 300 during rotation.

Figure 4A:
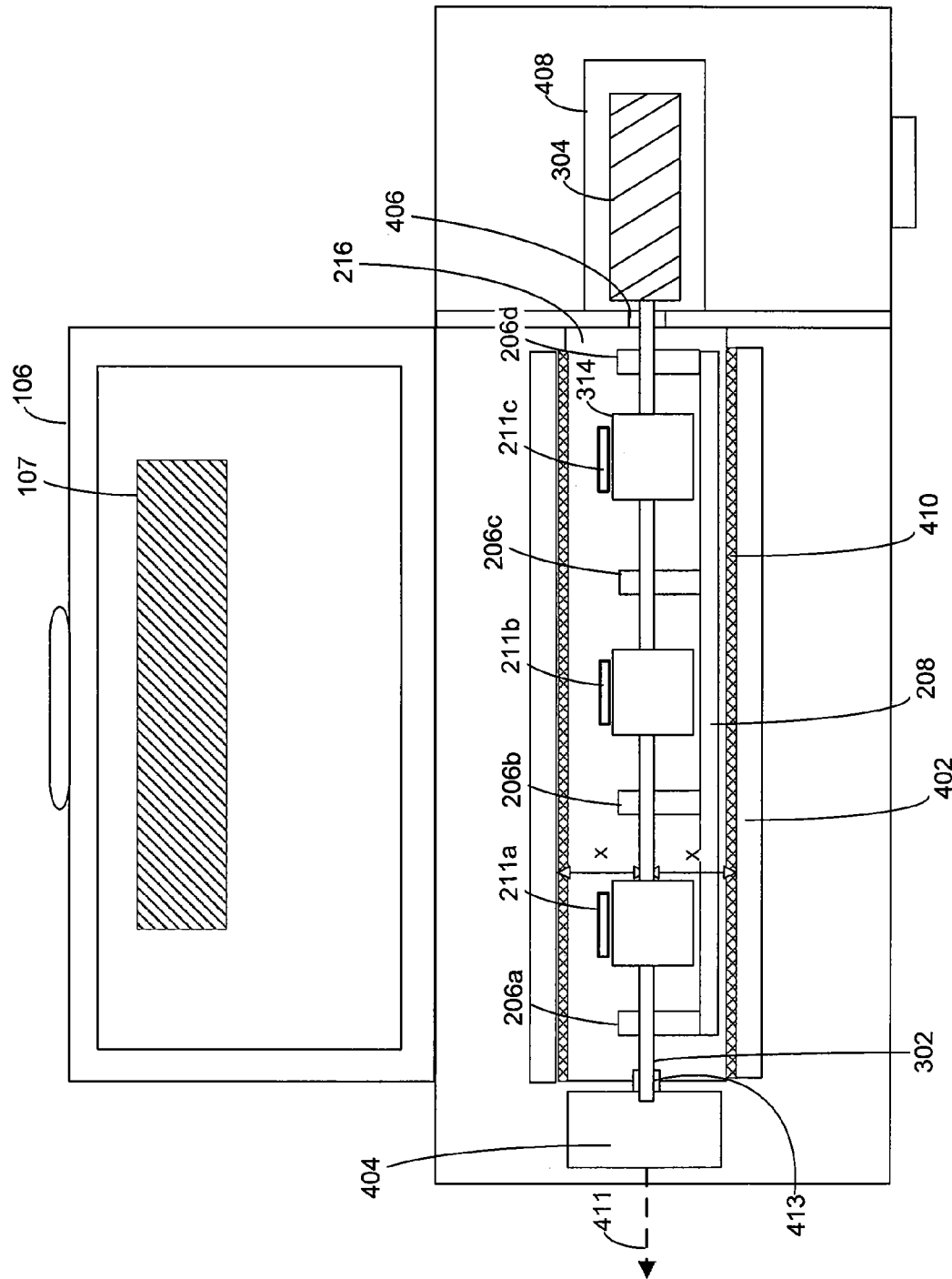
FIG. 4A depicts an exemplary top level view of the marshmallow roasting unit in which a skewer is positioned in a roasting chamber of the roasting unit consistent with the present invention.

FIG. 4A depicts one embodiment of the skewer 300 positioned in the roasting chamber 216 of the marshmallow roasting unit 100 in accordance with the present invention. The roasting chamber 216 includes at least one heating element 402, a rotation unit 404, a skewer securing unit 406, a handle compartment 408 and at least one heating element guard 410. The rotation unit 404, which may be a single or variable speed motor, is selectively coupled to one end of the skewer 300 and effective to rotate the skewer shaft 306 containing the marshmallows 314 at a predetermined angular speed effective in combination with the heating element 402 to evenly brown a circumferential surface of a marshmallow 314 held on the skewer 300 before the marshmallow falls from the skewer 300. However, a user may selectively remove the skewer 300 from the roasting unit 100 before the marshmallow 314 becomes pliable and falls off the skewer 300 towards the removable tray 108.

Each heating element guard 410 is disposed is proximity to a respective heating element 402 and at least partially surrounds the heating element 402 so that the heating element 402 is not directly exposed to the access opening 217. In one implementation, the heating element guard 410 extends around the respective heating element 402 so that the heating element is not directly exposed to a cracker 212 held on the removable tray 108 when the tray 108 is installed in the enclosure 108. Each heating element guard 410 may be comprised of aluminum or other conductive metal and may be 20% to 90% perforated so that the majority of heat radiated by the respective heating element 402 and reaching the guard 410 may be transferred through the guard 410 towards, for example, the marshmallow 314 on the skewer 300. The portion of each heating element guard 410 between the respective heating element 402 and the removable tray 108 (when installed in the roasting unit enclosure 102) may be less perforated (e.g., 0% to 50% perforated) than the remaining portion of the heating element guard 410 to inhibit or lessen the heat radiated towards a cracker 212 held on the removable tray 108. In this implementation, the cracker 212 is inhibited from baking or charring while the marshmallow 314 is roasting on the skewer 300 in accordance with the present invention.

The heating element 402 is disposed a distance (x) within a predetermined range from a central axis 411 of the skewer 300 and adapted to radiate heat at a temperature within 300° F. to 800° F. so that the heating element 402 is effective to roast a marshmallow 314 on the skewer 300 until the marshmallow becomes pliable and falls off the skewer 300 on to a cracker 212 or contents disposed on the cracker 212 held on the removable tray 108.

In one implementation, when the predetermined angular speed of the rotational unit 404 is set within the range of 2 revolutions per minute to 30 revolutions per minute, each heating element 402 (when activated to radiate heat at a temperature between 300° F. to 800° F.) may be disposed within a predetermined range of approximately 1 inch to 3 inches from the central axis 411 of the skewer 300 so that a marshmallow 314 held on the skewer 300 is evenly browned about its circumferential surface before the marshmallow 314 becomes pliable and falls from the skewer 300.

In an alternative implementation, when the predetermined angular speed of the rotational unit 404 is set within the range of 2 revolutions per minute to 30 revolutions per minute, each heating element 402 (when activated to radiate heat at a temperature between 300° F. to 800° F.) may be disposed within a predetermined range of approximately ¼ inch to 2¼ inches from an outer circumferential surface of the marshmallow 314 before roasting (e.g., a standard marshmallow having a diameter of approximately 1.25 inches before roasting) so that the heating element is effective to roast the marshmallow on the skewer until the marshmallow becomes pliable and falls off the skewer on to the cracker 212 or contents (e.g., a chocolate piece 214) disposed on the cracker held on the removable tray 108. In this implementation, the heating element 402 and the rotational unit 402 are effective in combination to evenly brown the circumferential surface of the marshmallow 314 before the marshmallow 314 becomes pliable and falls from the skewer 300.

Using a standard sized marshmallow having a diameter of 1.25 inches, the inventor has discovered that positioning the heating element 402 closer than 1 inch to the skewer 300 while radiating heat at or near 300° F. (or at greater temperatures) and rotating the skewer between 2 revolutions/minute to 30 revolutions/minute causes the marshmallow 314 to expand too quickly and ignite or burn before the inner portion of the marshmallow 314 melts or becomes pliable enough for the marshmallow 314 to fall from the skewer without igniting or burning. In particular, with the heating element 402 at closer than 1 inch to the skewer 300 and the heating element 402 radiating heat at a temperature of 450° F. or greater, the marshmallow 315 consistently expanded too quickly and contacted the heating element guard 410.

The inventor further discovered that positioning the heating element 402 farther than 3 inches from the skewer 300 while radiating heat at or near 300° F. (or at greater temperatures) and rotating the skewer between 2 revolutions/minute to 30 revolutions/minute causes the marshmallow 314 inside of the marshmallow 314 to melt or become pliable and the marshmallow 314 then falls from the skewer 300 before the circumferential surface of the marshmallow 314 has been sufficiently browned or even lightly toasted (i.e., remains effectively white).

When the heating element 402 was positioned at approximately 2 inches from the central axis 411 of the skewer 300 while radiating heat in a range of 350° F. to 500° F. and rotating the skewer between 2 revolutions/minute to 12 revolutions/minute consistently causes the marshmallow 314 to be evenly browned about its circumferential surface before the marshmallow 314 becomes pliable and falls from the skewer 300.

Accordingly, the heating element 402 (when disposed within a range of 1 to 3 inches from the skewer 300 while radiating in a range of 300° F. to 800° F., and preferably in a range of 350° F. to 500° F.) in combination with the predetermined angular speed of the rotation unit 404 (e.g., between 2 to 30 revolutions/minute, and preferably 2 to 12 revolutions/minute) is effective to brown the circumferential surface of the marshmallow 314 evenly while enabling the marshmallow 314 to become pliable and fall to a cracker 212 held on the removable tray 108 in accordance with the present invention.

To obtain marshmallow roasting temperatures in a range of 300° F. to 800° F., one or two heating elements 402 of approximately 650 watts to 1200 watts collectively were employed. However, as one of ordinary skill in the art will appreciate, a different number of heating elements and a different wattage of each heating element may be employed in combination to produce a roasting or radiating heat temperature within the range of 300° F. to 800° F.

In another embodiment, the heating element 402 may be attached to a chain drive or track coupled to a manual crank (not shown in figures) or to the rotational unit 404 to vary or adjust the distance (x) of the heating element 402 from the skewer shaft 306, for example, within the predetermined range of 1 to 3 inches.

In one implementation shown in FIG. 4A, the end 302 of the skewer 300 opposite the handle 304 is adapted to be selectively engaged to an end of a rotor shaft 413 of the motor comprising the rotational unit 404. The end of the rotor shaft 413 may be formed as a ratchet to receive and rotatively engage the end 302 of the skewer 300 when the skewer 300 is coaxially aligned with the rotor shaft 413. In an alternative embodiment, a cam (not shown in figures) may be employed to link the rotor shaft 413 to the end 302 of the skewer 300.

The skewer securing unit 406 may be a ball bearing or u-shaped notch in an inner wall 413 configured to allow the skewer shaft 306 to rotate freely while restricting the lateral and horizontal movement of the skewer 300. The handle compartment 408 may be configured to prevent the handle 304 from heating during the roasting process. In an alternative implementation, the handle compartment 408 may be omitted when the timer 105 and timer dial 104 are moved near the rotational unit 404 within the enclosure 102 so that the enclosure 102 may be reduced in size, enabling the skewer handle 304 to be disposed external to the enclosure 102 and exposed to ambient air.

In another embodiment, depicted in FIG. 4B, the skewer 300 may be coupled to the rotation unit 404 by a gear 412a located on one or both ends of the skewer shaft 306. In this embodiment, a first gear 412a may be secured to one or both ends of the skewer 306 with the skewer shaft 306 fitting through the center of the gear 412a. A second gear 412b may be secured to the rotation unit 404. The rotation unit 404 may be mounted underneath the first gear 412a and may be engaged with the second gear 412b on the rotation unit 404. As the rotation unit 404 rotates, the second gear 412b moves the first gear 412a to rotate the skewer shaft 306. In an alternative embodiment, the gears 412a and 412b may be replaced with rubber wheels or other type of wheels that may contact each other. In this implementation, the wheel replacing gear 412b is coupled to the rotational unit 404 and through contact friction causes the other wheel replacing gear 412a to move and correspondingly rotate the skewer shaft 306.

In another embodiment, the rotation unit 404 may be coupled to a rubber wheel 414 using a tension band 416, as depicted in FIG. 4C. In this embodiment, the skewer shaft 306 may be inserted through a center hole in a first rubber wheel 414. A second rubber wheel 418 may be installed on the rotation unit 404. The two rubber wheels may be coupled using a tension band 416 or by direct contact of the two wheels. The tension band 416 may include, but not limited to, a rubber belt, a steel belt, a plastic belt or any other appropriate type of tension belt.

Figure 5:
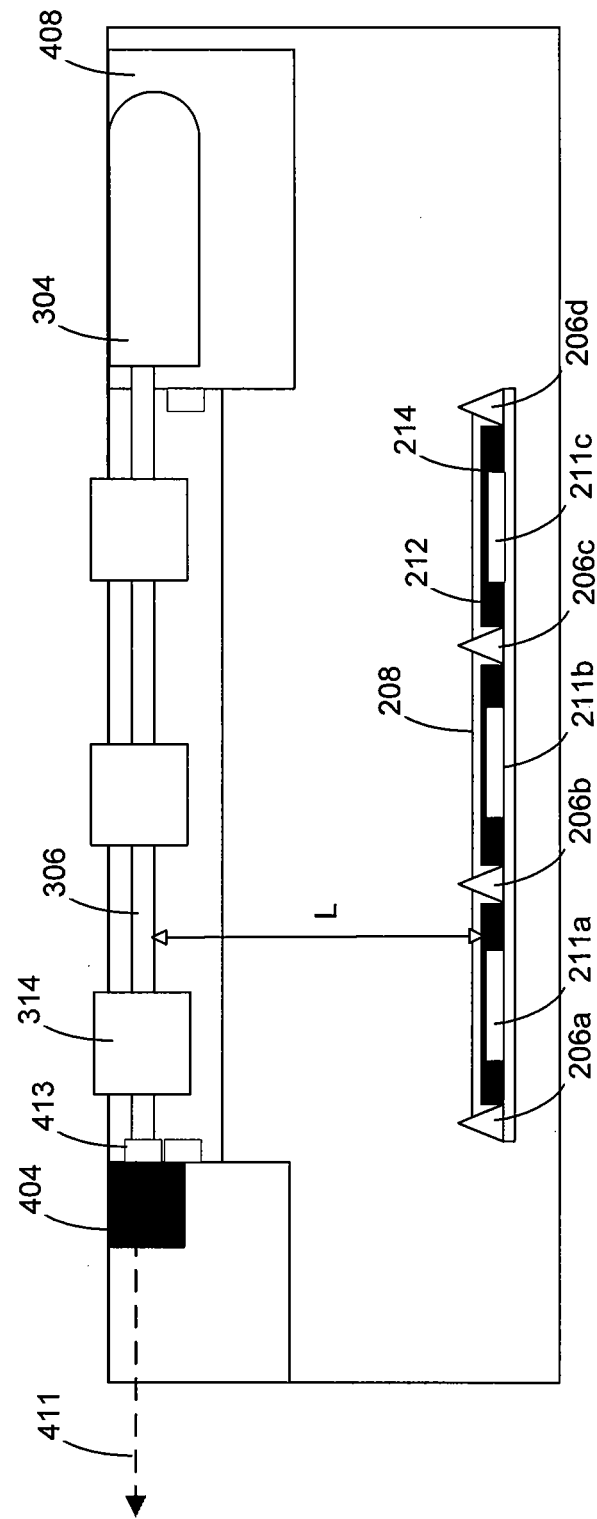
FIG. 5 depicts an exemplary cut away view of the marshmallow roasting unit consistent with the present invention, where crackers held on the removable tray are positioned under a skewer disposed in the roasting unit and in alignment with marshmallows held on the skewer.

FIG. 5 depicts a cut away view of one embodiment of the marshmallow roasting unit 100 consistent with the present invention. In this embodiment, the skewer shaft 306 is connected to the rotation unit 404 and installed in the roasting chamber 216 as previously discussed. As shown in FIG. 5, when the removable tray 108 is installed in the enclosure 102 via enclosure opening 110, the removable tray 108 is disposed under the roasting chamber 216 and the skewer 300 installed in the roasting chamber 216. Alignment elements 206 on the removable tray 108 may be configured to align both cracker 212 and chocolate pieces 214 together. The rotation unit 404 may be coupled to the shaft 306 using a shaft coupling device (e.g., ratchet end of rotor shaft 413) located between the shaft and the rotation unit 404. The shaft coupling device 413 may be configured to securely attach the skewer shaft 306 to the rotation unit 404 in such a way that the shaft 306 does not slip during operation. The removable tray 108 is positioned directly under the marshmallows 314 on the skewer 300, where the alignment elements 206 are configured to position each cracker 212 held within a cracker placement area 210a-210c on the tray 108 below a respective marshmallow held on the skewer 300. As the marshmallows 314 are heated, the marshmallows 314 drop off the skewer 300 and fall on to the gram cracker 212 and chocolate piece 214 collectively positioned below the respective marshmallow 314. The skewer 300 is located a predetermined distance (L) from the top edge of the removable tray 108. The predetermined distance L is set to a distance effective to prevent residue from the fallen roasted marshmallows 314 from remaining coupled between the fallen marshmallow 314 and the skewer 300. If the residue is allowed to remain coupled between the fallen roasted marshmallow 314 and the skewer 300, the residue may wrap around the skewer 300 or prevent the marshmallow 314 from completely falling off the skewer 300. In one implementation, the predetermined distance (L) between the skewer 300 and the removable tray 108 is 4.5 inches or more.

One feature of the marshmallow roasting unit 100 is that the enclosure opening 110 is sized to enable the removable tray 108 to be removed from the enclosure 102 and the enclosure opening 110 with each cracker 212 disposed on the tray 108 and each marshmallow 314 after roasting disposed at least partially on the respective cracker 212 (or on a chocolate piece 214 stacked thereon) without the enclosure side 109 interfering with the roasted marshmallow 314. This is advantageous as each marshmallow 314 may expand significantly (e.g., 1.5 times) during roasting of the respective marshmallow 314 as described herein. Thus, the S'mores that are created (e.g., a gram cracker 212, a chocolate piece 214 and a roasted marshmallow 314) may be easily removed from the roasting unit 100 without interference from the enclosure side 109 defining the opening 110. In one implementation in which a standard marshmallow having a diameter of approximately 1.25 inches may expand during roasting to more than 1.5 times the diameter of the marshmallow, the enclosure opening 110 is sized to have a height of 2 to 4 inches to allow for clearance of the tray 108 holding the cracker 212, a piece of chocolate 214 on the cracker 212, and a standard marshmallow 314 disposed on the chocolate piece 214 and expanded due to roasting as described herein.

Another feature of the marshmallow roasting unit 100 is that the heating elements 402, the heating element guards 410, and the rotation unit 402 including the rotor shaft 413 are each one of a plurality of components disposed within the enclosure 102 in proximity to the roasting chamber 216 as best shown in FIGS. 2C and 5. Each of the components is positioned relative to the skewer 300 so that, when the removable tray 108 is inserted in the enclosure opening 110, each marshmallow 314 held on the skewer 300 is able to fall off the skewer during the roasting operation to a respective cracker 212 or contents (e.g., a respective chocolate piece 214) disposed on the cracker 212 held on the removable tray 108 without contacting a heating element 402 or another one of the components (e.g., a heating element guard 410 or rotational unit 404) within the enclosure 102. Thus, unlike conventional ovens or toasters that may have a grill shelf or heating element disposed near the bottom of the conventional oven that could interfere with a marshmallow falling towards the oven bottom, a marshmallow roasting unit 100 consistent with the present invention does not have a component between the skewer 300 and the removable tray 108 installed in the enclosure 102 that may interfere with a roasted marshmallow falling from the skewer 300 to a cracker positioned on the removable tray 108.

Figure 6:
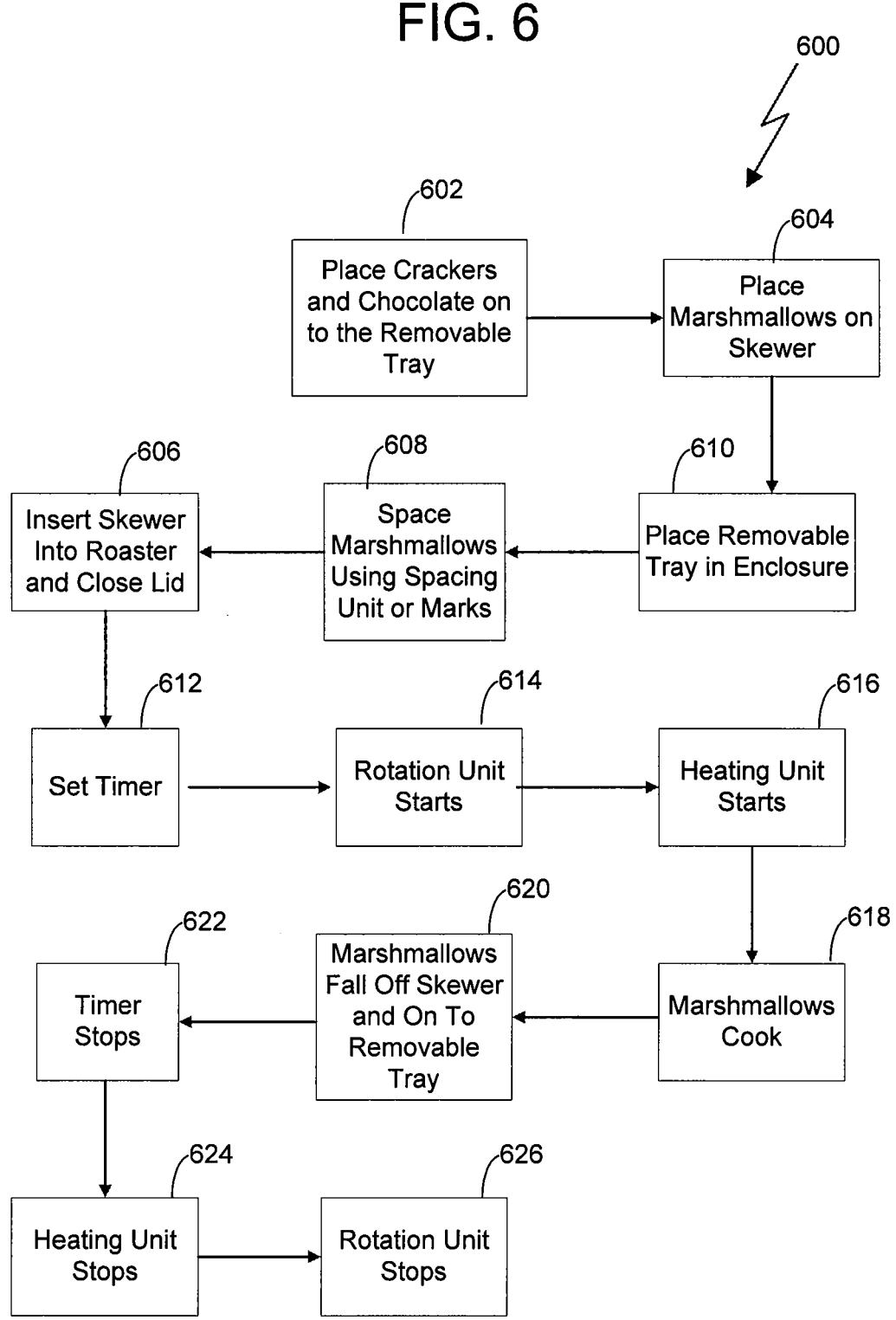
FIG. 6 is a flow diagram depicting an exemplary process for creating a S'more using the marshmallow roasting unit in accordance with the present invention.

FIG. 6 is a flow diagram depicting an exemplary process 600 for creating a S'more using the marshmallow roasting unit 100 in accordance with the present invention. First, one or more crackers 212 and chocolate pieces 214 are placed on the removable tray 108 between the alignment elements 206 or in the cracker placement areas 210a-210c defined by the alignment elements 206 (step 602). Each cracker 212 may be butted up against the backstop element 208 and between the backstop element 208 and a respective rib 211a, 211b, or 211c. Alignment elements 218 may also be used to align each chocolate piece 214 on a respective cracker 212.

Once each cracker 212 and chocolate piece 214 are positioned on the removable tray, the removable tray 108 is inserted in to the enclosure 102 (Step 604). Next, the marshmallows 314 are placed on the skewer shaft 306 (Step 606) and are spaced apart a corresponding distance using the spacing unit 308 (Step 608). The skewer 300 is then placed in to the roasting chamber 216 (Step 610). The lid 106 may optionally be closed. Next, the timer 104 is started (Step 612). Once the timer begins, the rotation unit 404 and heating elements 402 start (Steps 614 and 616). In an alternative implementation, the heating element 402 may be powered on via a switch (not shown in Figures) separate from the timer 104 that controls the rotation unit 404. In this implementation, the heating element 402 need not be turned off when the removable tray 108 is removed from the enclosure 102 to access the crackers or S'mores created when performing the process 600 or when the skewer 300 is removed from the roasting chamber 216 to add new marshmallows to be roasted.

Next, the rotation unit 404 and heating elements roast the marshmallows 314 until they fall off of the skewer 300 and on to the crackers 212 or chocolate 214 stacked on the crackers on the removable tray 108 (Step 618). After or at approximately the same time as the marshmallows 314 fall off of the skewer 300, the timer 104 stops (Step 620), the heating elements 402 stops (Step 622) either via the timer 104 or via the separate manual switch for the heating element 204, and the rotation unit 404 stops (Step 624).

Figure 7:
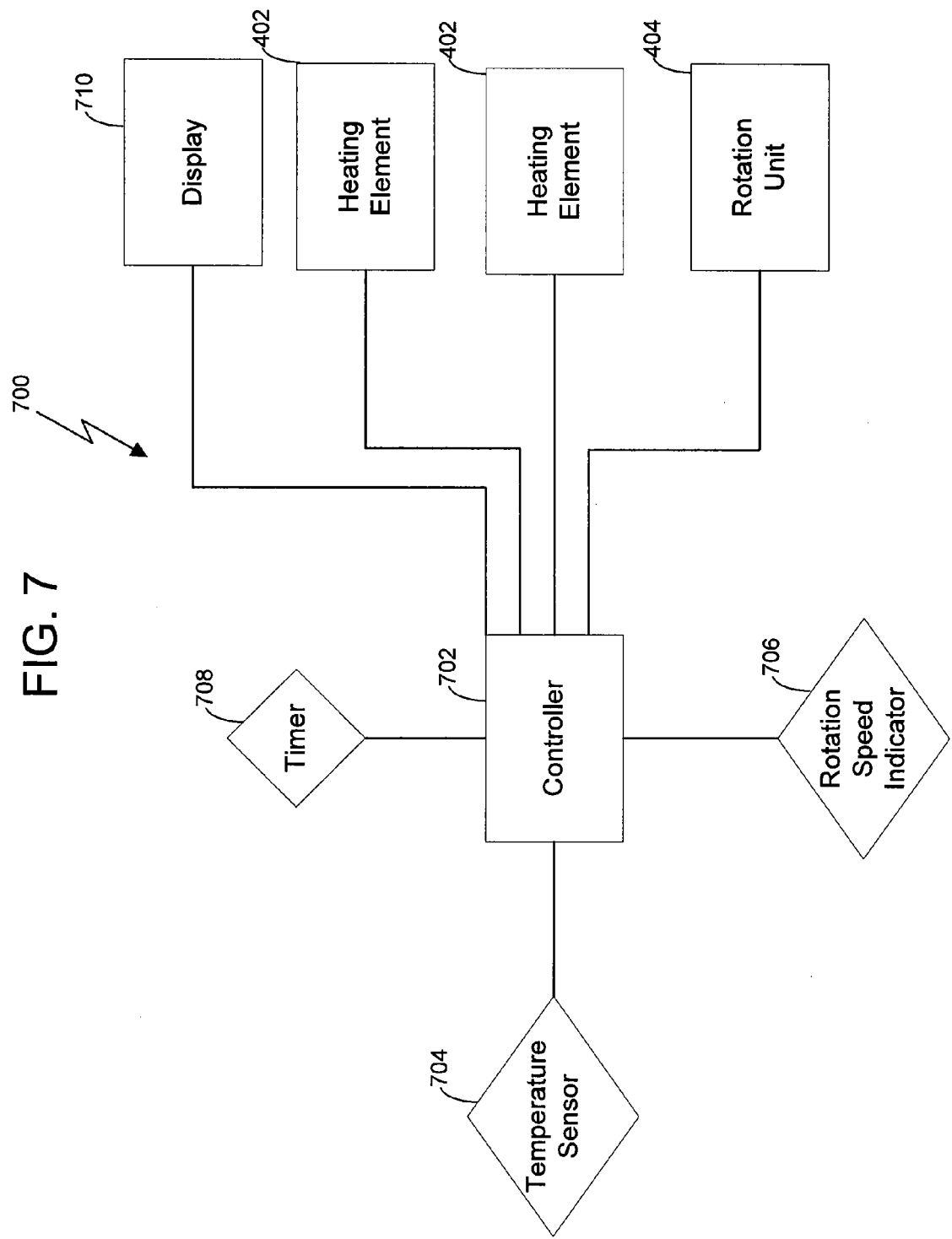
FIG. 7 is a block diagram depicting a control system for the marshmallow roasting unit consistent with the present invention.

FIG. 7 is a block diagram depicting an exemplary control system 700 for the marshmallow roasting unit 100 consistent with the present invention. The control system 700 includes, a control unit 702, a temperature sensor 704, a rotational speed sensor 706, a timer 708, at least one heating element 402, a rotation unit 404 and a display 710. The control system 700 also includes a portable battery or have a power source for connecting to conventional power receptacle. The portable battery or power source are not shown in the figures to avoid obscuring the present invention.

The control unit 702 may include a CPU and memory storing a control program containing instructions executed by the CPU for controlling the operation of each heating element 402 and the rotation unit 404 as described herein. In an alternative embodiment, the control unit 702 may be implemented in hardware alone, using ASIC or programmable logic arrays, for example.

At least one temperature sensor 704 may be installed near the skewer shaft 306 in the roasting chamber 216 and may be electrically coupled to the control unit 702. A rotational speed sensor 706 may be installed on the shaft 306 and may be electrically coupled to the control unit 702.

In one embodiment, the control unit 702 may be configured to monitor the temperature as measured by the temperature sensor 704. The control unit 702 may be configured to modulate or adjust power to each heating element 402 to maintain a temperature set point (or predetermined temperature) in the roasting chamber 216. In another embodiment, the control unit 702 may be configured to monitor the sensed angular or rotational speed of the skewer shaft 306 as measured and output by the rotational speed sensor 706 to the control unit 702. The control unit 702 modulates or adjusts power to the rotation unit 404 to maintain a predetermined rotational speed set point based on the sensed angular speed of the skewer so that the skewer 300 is driven at the predetermined rotational speed. In yet another embodiment, the control unit modulates or adjusts power to both the rotation unit 404 and the heating element 402 simultaneously to maintain their respective set points. Rotational speed and temperature set points may be adjustable through a display unit 710, which may be located on the front side 109 of the enclosure 102 or via dials located on the front side 109 of the enclosure 102.

In another embodiment consistent with the present invention, a photo-eye 502 coupled to the controller 702 may be positioned just underneath the marshmallows 314 on the skewer 300 in the roasting chamber 216. Once all of the marshmallows 314 fall off of the skewer 300, the contact on the photo-eye 502 is closed and, upon receiving an indication from the photo-eye 502 that the contact on photo-eye 502 is closed, the controller 702 causes the rotation unit 414 and heating elements 402 to power off or stop. In another embodiment, the insertion of the skewer 300 in the roasting chamber 216 closes a contact switch (not shown in figures) that automatically starts the rotation unit 404 and heating elements 402.

Figure 8A:
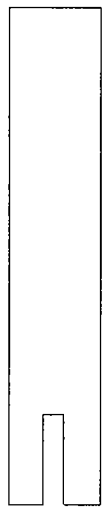
FIGS. 8A, 8B and 8C depict embodiments of skewer cleaning units consistent with the present invention.
Figure 8B:
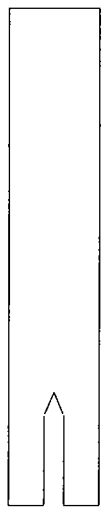
Figure 8C:

FIGS. 8A, 8B and 8C depict a skewer cleaning unit 800 consistent with the present invention. The skewer cleaning unit 800 comprises a plate 802 including a notch 804 cut on one end of the plate. The notch 804 may be effective to make contact with the surface of the skewer shaft 306 and remove any marshmallow residue remaining on the skewer shaft 306 after roasting has completed. In another embodiment, depicted in FIG. 8A, the notch 804 may be a rectangular shape. In another embodiment, depicted in FIG. 8B, the arc of the bottom of the notch 804 may be formed to the same arc as the skewer shaft 306. In yet another embodiment, depicted in FIG. 8C, the notch 804 may be a triangular shape with the apex of the triangle on the furthest inside portion of the plate 802.

As one of ordinary skill in the art will appreciate, by producing even and high heat intensity (e.g., between 300° F. to 800° F.) consistent with the present invention, marshmallows 314 may be toasted to a golden brown in approximately two minutes or less. Also, because of the uniform heating of the marshmallow while the marshmallows are rotated, a superior quality of roasted marshmallow is produced. By controlling the temperature in the roasting unit 100 to maintain an adjustable set point, a marshmallow 314 may be roasted to a level of browning in accordance with the user's preference.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A marshmallow roasting unit, comprising:
an enclosure having a roasting chamber and a side defining an enclosure opening below the roasting chamber;
a skewer disposed in the roasting chamber and configured to hold a marshmallow;
a removable tray configured to be inserted into the enclosure opening and hold a cracker in the enclosure under the roasting chamber; and
a heating element disposed within a predetermined range from a central axis of the skewer so that the heating element is effective to roast the marshmallow on the skewer until the marshmallow becomes pliable and falls off the skewer on to the cracker or contents disposed on the cracker held on the removable tray,
wherein, the removable tray includes a bottom having a front end and a rear end, and a plurality of alignment elements disposed between the front end and rear end, an adjacent pair of the alignment elements defining a respective cracker placement area relative to the bottom and configured to position the cracker between the alignment elements on the bottom of the removable tray below the marshmallow on the skewer when the removable tray is inserted into the enclosure opening such that when the marshmallow is roasted, becomes pliable and falls off the skewer, the marshmallow falls on to the cracker or contents disposed on the cracker, and
wherein each alignment element corresponds to a raised divider spaced apart laterally on the tray in a direction corresponding to the axis of rotation of the skewer when the skewer is disposed in the roasting chamber, at least one of the adjacent pair of alignment elements being disposed internally on the tray to hold the cracker laterally in place on the tray relative to the other one of the adjacent pair of alignment elements,
wherein the removable tray further includes a backstop element and a rib, the backstop element is disposed relative to the adjacent pair of alignment elements to inhibit the cracker positioned in the cracker placement area from moving towards the front end of the tray, and
wherein the rib rises less than a thickness of the cracker above the bottom of the tray, and is disposed between the adjacent pair of alignment elements and the rear end of the tray such that the rib inhibits the cracker positioned in the cracker placement area from moving towards the rear end unless the bottom of the tray is tilted the front end towards the rear end at a predetermined angle at which gravity enables the cracker to slide over the rib.

2. The marshmallow roasting unit of claim 1, wherein the skewer is removable from the roasting chamber.

3. The marshmallow roasting unit of claim 1, wherein the alignment elements are adjustable for positioning the cracker on the removable tray.

4. The marshmallow roasting unit of claim 1, wherein the enclosure opening is sized to enable the removable tray to be removed from the enclosure opening with the cracker disposed on the tray and the marshmallow after roasting disposed at least partially on the cracker without the enclosure side interfering with the marshmallow.

5. The marshmallow roasting unit of claim 1, wherein the alignment elements have a height sufficient to align a chocolate piece and the cracker together.

6. The marshmallow roasting unit of claim 1, further comprises a marshmallow spacing unit that is adapted to be aligned with the skewer and having an indicator reflecting where to position the marshmallow on the skewer when the spacing unit is aligned with the skewer so that the marshmallow is disposed directly above the cracker when the removable tray is inserted in the enclosure opening.

7. The marshmallow roasting unit of claim 6, wherein the marshmallow spacing unit is affixed to an external surface of the enclosure.

8. The marshmallow roasting unit of claim 1, wherein the skewer has an identifier reflecting where to position the marshmallow on the skewer.

9. The marshmallow roasting unit of claim 8, wherein the identifier is a first portion of the skewer having a color different than a remaining portion of the skewer.

10. The marshmallow roasting unit of claim 1, wherein the predetermined range is approximately 1 inch to 3 inches.

11. The marshmallow roasting unit of claim 10, further comprising: a rotation unit rotatively coupled to the skewer, wherein, the rotation unit has a predetermined angular speed effective in combination with the heating element to evenly brown a circumferential surface of the marshmallow before the marshmallow falls from the skewer.

12. The marshmallow roasting unit of claim 11, wherein the predetermined angular speed is between 2 and 30 revolutions per minute.

13. The marshmallow roasting unit of claim 12, wherein the heating element radiates heat at a temperature in a range between 300° F. to 800° F.

14. The marshmallow roasting unit of claim 11, wherein the predetermined angular speed is between 4 and 12 revolutions per minute.

15. The marshmallow roasting unit of claim 14, wherein the heating element radiates heat at a temperature in a range between 350° F. to 500°F.

16. The marshmallow roasting unit of claim 11, wherein the heating element is one of a plurality of components disposed within the enclosure, each of the components is positioned relative to the skewer so that, when the removable tray is inserted in the enclosure opening, the marshmallow is able to fall off the skewer to the cracker or contents disposed on the cracker held on the removable tray without contacting the heating element or another one of the components within the enclosure.

17. The marshmallow roasting unit of claim 1, wherein the skewer holds a plurality of marshmallows; the removable tray holds a plurality of crackers; the plurality of alignment elements are configured to position each of the crackers below a respective one of the marshmallows on the skewer when the removable tray is inserted into the enclosure opening; and each of the components within the enclosure is positioned relative to the skewer so that, when the removable tray is inserted in the enclosure opening, each marshmallow is able to fall off the skewer to a respective one of the crackers or contents disposed on the respective cracker held on the removable tray without contacting the heating element or another one of the components within the enclosure.

18. The marshmallow roasting unit of claim 1, further comprising: a heating element disposed in a range between $\frac{1}{4}$ inch to $2\frac{1}{4}$ inches from an outer surface of the marshmallow before roasting so that the heating element is effective to roast the marshmallow on the skewer until the marshmallow becomes pliable and falls off the skewer on to the cracker or contents disposed on the cracker held on the removable tray.

19. The marshmallow roasting unit of claim 1, wherein the skewer holds a plurality of marshmallows:, the removable tray holds a plurality of crackers; and the plurality of alignment elements are configured to position each of the crackers below a respective one of the marshmallows on the skewer when the removable tray is inserted into the enclosure opening.

20. A marshmallow roasting unit comprising:
an enclosure having a roasting chamber and a side defining an enclosure opening below the roasting chamber;
a skewer disposed in the roasting chamber and configured to hold a marshmallow having a diameter of approximately 1.25 inches before being held on the skewer;
a rotation unit rotatively coupled to the skewer and having a predetermined angular speed;
a heating element disposed relative to the skewer in the roasting chamber and the heating element radiates heat at a pre-determined temperature in a range between 350°F. m 500°F. ; and
a removable tray configured to be inserted into the enclosure opening and hold a cracker in the enclosure under the roasting chamber, the removable tray including: a plurality of alignment elements configured to position the cracker below the marshmallow on the skewer when the removable tray is inserted into the enclosure opening, a bottom having a front end and a rear end, and the plurality of alignment elements are disposed between the front end and rear end, an adjacent pair of the alignment elements defining a respective cracker placement area relative to the bottom and configured to position the cracker between the alignment elements of the bottom of the removable tray below the marshmallow on the skewer when the removable tray is inserted into the enclosure opening, wherein each alignment element corresponds to a raised divider spaced apart laterally on the tray in a direction corresponding to the axis of rotation of the skewer when the skewer is disposed in the roasting chamber, at least one of the adjacent pair of alignment elements being disposed internally on the tray to hold the cracker laterally in place on the tray relative to the other one of the adjacent pair of alignment elements, and a rib that rises less than a thickness of the cracker above the bottom of the tray, and is disposed between the adjacent pair of alignment elements and the rear end of the tray such that the rib inhibits the cracker positioned in the cracker placement area from moving towards the rear end unless the bottom of the tray is tilted the front end towards the rear end at a predetermined angle at which gravity enables the cracker to slide over the rib,
wherein, the heating element is disposed relative to the skewer and within a predetermined range of 1 to 3 inches from a central axis of the skewer such that, when the heating element is radiating at the predetermined temperature and the rotation unit is rotating at the predetermined angular speed, the heating element and the rotation unit are effective to roast the marshmallow on the skewer so that the marshmallow becomes pliable and falls on to the cracker or contents disposed on the cracker held on the removable tray and to evenly brown a circumferential surface of the marshmallow before the marshmallow falls from the skewer.

21. The marshmallow roasting unit of claim 20, wherein the predetermined angular speed is between 2 and 30 revolutions per minute.

22. The marshmallow roasting unit of claim 20, wherein the predetermined angular speed is between 4 and 12 revolutions per minute.

23. The marshmallow roasting unit of claim 20, wherein the heating element is one of a plurality of components disposed within the enclosure, each of the components is positioned relative to the skewer so that, when the removable tray is inserted in the enclosure opening, the marshmallow is able to fall off the skewer to the cracker or contents disposed on the cracker held on the removable tray without contacting the heating element or another one of the components within the enclosure.

24. The marshmallow roasting unit of claim 20, wherein the alignment elements are adjustable for positioning the cracker on the removable tray.

25. The marshmallow roasting unit of claim 20, wherein the enclosure opening is sized to enable the removable tray to be removed from the enclosure opening with the cracker disposed on the tray and the marshmallow after roasting disposed at least partially on the cracker without the enclosure side interfering with the marshmallow.

26. The marshmallow roasting unit of claim 20, wherein the alignment elements have a height sufficient to align a chocolate piece and the cracker together.

27. The marshmallow roasting unit of claim 20, further comprises: a marshmallow spacing unit that is adapted to be aligned with the skewer and having an indicator reflecting where to position the marshmallow on the skewer when the spacing unit is aligned with the skewer so that the marshmallow is disposed directly above the cracker when the removable tray is inserted in the enclosure opening.

28. The marshmallow roasting unit of claim 20, wherein the skewer has an identifier reflecting where to position the marshmallow on the skewer.

29. The marshmallow roasting unit of claim 28, wherein the identifier is a first portion of the skewer having a color different than a remaining portion of the skewer.

30. The marshmallow roasting, unit of claim 20 further comprising a controller; and a temperature sensor disposed in the roasting chamber and electrically coupled to the controller, wherein the controller is configured to control the heating element to maintain the predetermined. temperature in the roasting chamber.

31. The marshmallow roasting unit of claim 20, wherein the removable tray further includes a backstop element disposed relative to the adjacent pair of alignment elements to inhibit the cracker positioned in the cracker placement area from moving towards the front end of the tray.

* * * * *